C. C. ENDERS.
SWINGLETREE HOOK.
APPLICATION FILED MAR. 25, 1908.

899,104.

Patented Sept. 22, 1908.

Inventor
Carson C. Enders

Witnesses

UNITED STATES PATENT OFFICE.

CARSON C. ENDERS, OF ENDERS, PENNSYLVANIA.

SWINGLETREE-HOOK.

No. 899,104.　　　Specification of Letters Patent.　　Patented Sept. 22, 1908.

Application filed March 25, 1908. Serial No. 423,083.

*To all whom it may concern:*

Be it known that I, CARSON C. ENDERS, a citizen of the United States, residing at Enders, in the county of Dauphin and State of Pennsylvania, have invented certain new and useful Improvements in Swingletree-Hooks, of which the following is a specification.

This invention relates to certain new and useful improvements in swingletree hooks, the object being to provide a hook which is so constructed that the trace will be securely locked after once placed therein, so that all danger of it accidentally coming out is prevented.

A further object of my invention is to provide a spring member for closing the hook provided with a socket at its end adapted to receive a ball formed on the end of a hook, so that after the trace is forced over the hook, the spring will close the opening of the hook.

Figure 1:
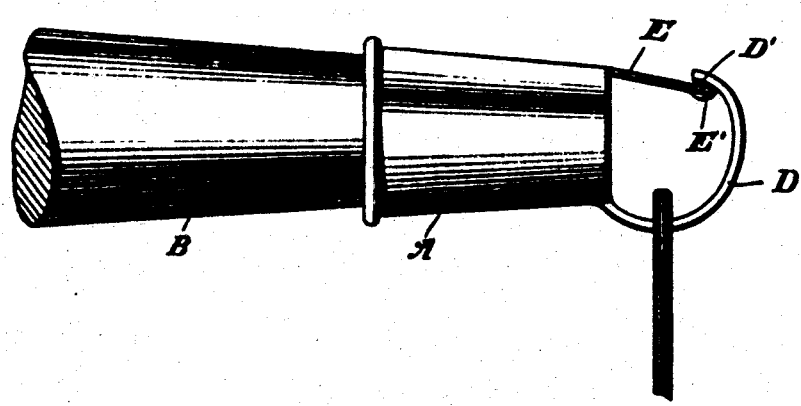
Figure 2:
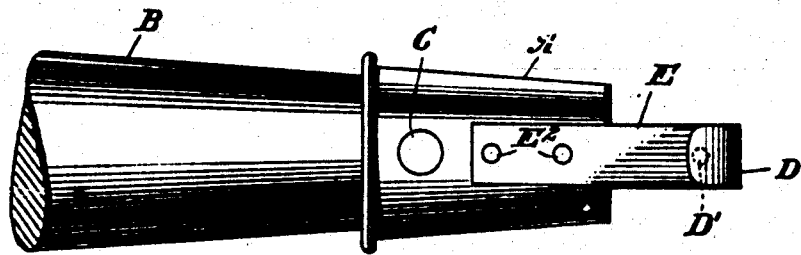
Figure 3:
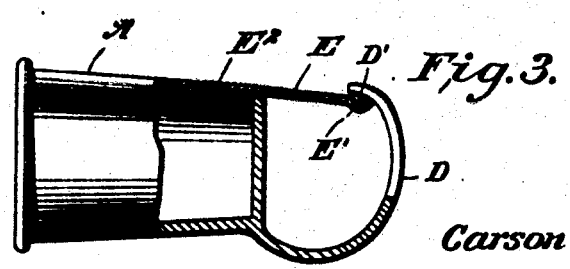

These objects are obtained by the novel arrangement and construction of parts hereinafter fully described and shown in the accompanying drawings in which:

Figure 1, is a top view of my improved swingletree hook showing it attached to a swingletree. Fig. 2, is a side elevation of the same, and, Fig. 3, is a top view partly in section showing the manner of connecting the spring to the hook.

In the drawings A, indicates a socket forming the body of my improved swingletree hook, which is placed over the end of a swingletree B, and secured thereto by a rivet or bolt C, passing transversely through the swingletree, so as to securely lock it thereon, and it will be seen that the strain of the hook will be brought directly on the swingletree.

Extending out from the end of the body is a hook member D, provided with a ball D', at its end, adapted to fit in a socket E', formed in the end of a flat spring E, which is secured by rivets E² in a recess formed in the body, and it will be seen that the trace or trace hook can be readily slipped over the hook, the spring yielding so as to allow the loop or trace to pass by the same, and then returned to its normal position, so as to securely close the opening of the hook, the ball fitting in the socket so as to securely hold the spring in its proper position. By this arrangement the spring will be held in place and securely locked at its end, so as to resist any pressure which might be brought against the same by the trace or hook, so as to bend the spring and force it by the end of the hook.

It will be seen that my trace hook is provided with means for holding the spring locking member in position and preventing the locking member being forced rearwardly and out of engagement with the inside hook D. It is also to be noted that by providing this ball and socket locking member, it is possible for me to use a very much lighter spring E, for the reason that the ball and socket prevents the spring E from being bent, in other words, holds it stretched out tightly. While the ball and socket acts as a lock, it also facilitates the introduction of the trace into the hook as the ball D' allows the trace to easily snap into place, which would not be the case were a lug or other angular sided locking member provided.

Having thus described my invention what I claim as new and desire to secure by Letters Patent is:—

1. A swingletree hook comprising a cap like body adapted to fit over and be secured to the end of a swingletree, said body having a laterally flat hooked portion projecting therefrom provided with a ball on the end thereof, and a flat spring attached to said cap, the outer end thereof having a semi-spherical recess on its upper face to receive said ball.

2. A swingletree hook comprising a cap like body adapted to fit over and be secured to the end of a swingletree and having a longitudinal recess formed therein, said cap having a hooked portion projecting therefrom provided with a ball formed on the underside of the end thereof, and a flat spring located in the recess of said cap and riveted thereto, the outer end of said flat spring projecting beneath the end of the hook and provided with a semi-spherical recess adapted to engage with the ball on said hook.

In testimony whereof I have signed my name to this specification in the presence of two subscribing witnesses.

CARSON C. ENDERS.

Witnesses:
G. W. SHULTZ,
E. M. SHULTZ.